United States Patent [19]

Moore

[11] 3,817,551
[45] June 18, 1974

[54] TANDEM AXLE VEHICLE SUSPENSION

[75] Inventor: Robert G. Moore, Elkhart, Ind.

[73] Assignee: Hickman Developments, Inc., Eden, N.Y.

[22] Filed: July 28, 1972

[21] Appl. No.: 276,030

[52] U.S. Cl. .................. 280/104.5 A, 280/106 T
[51] Int. Cl. ............................................ B60g 5/02
[58] Field of Search.. 280/104.5 R, 104.5 A, 106 R, 280/106 T, 124 R; 267/63 R, 63 A, 57.1 R, 57.1 A; 296/28 M

[56] References Cited
UNITED STATES PATENTS

| | | | |
|---|---|---|---|
| 2,665,142 | 1/1954 | Talbert | 280/104.5 B |
| 3,301,573 | 1/1967 | Hickman | 280/104.5 R |
| 3,309,106 | 3/1967 | Spence | 280/104.5 R |
| 3,393,920 | 7/1968 | Ehrlich | 280/106 T |

Primary Examiner—David Schonberg
Assistant Examiner—John A. Carroll
Attorney, Agent, or Firm—Harold I. Popp

[57] ABSTRACT

Tandem axles, supported by rubber tired wheels, support the ends of a walking beam at each side of the vehicle. The frame includes a flat bed panel having side recesses housing the wheels. Bed panel edge bars are fast to the opposite edges of the bed panel and include bridge portions arching over the recesses. A first frame bracket depends from each bridge portion. A second frame bracket is fixed, at the center of each recess, to a main longitudinal side frame beam supporting the bed panel. Rectilinear movement shear rubber spring means support each pair of such first and second frame brackets on the centers of the corresponding walking beams. The metal parts of these spring means, as well as the frame brackets, are formed and welded plates of light and simple construction.

9 Claims, 5 Drawing Figures

TANDEM AXLE VEHICLE SUSPENSION

One of the principal objects of the invention is to provide a vehicle frame and spring suspension both of which are light in weight but of sturdy construction. This is achieved by both a novel lightweight frame construction and a light spring suspension. Elements of both the frame and suspension are made compatible to achieve such reduction in weight without sacrifice in sturdiness.

Another object of the invention is to achieve such construction with low cost parts such as a plywood panel, and metal beams, bars, posts and plates of simple configuration and connected by simple welds.

Another object is to achieve such lightweight, sturdy and low cost construction without sacrifice of the advantages of long, service-free life, and improved friction free ride with wide effective spring centers to provide greatly increased sidesway control, all as outlined in the Hickman U.S. Pat. No. 3,301,573 dated Jan. 31, 1967.

Other objects and advantages of the invention will be apparent from the following description and drawings in which.

THE VEHICLE FRAME

Figure 1:
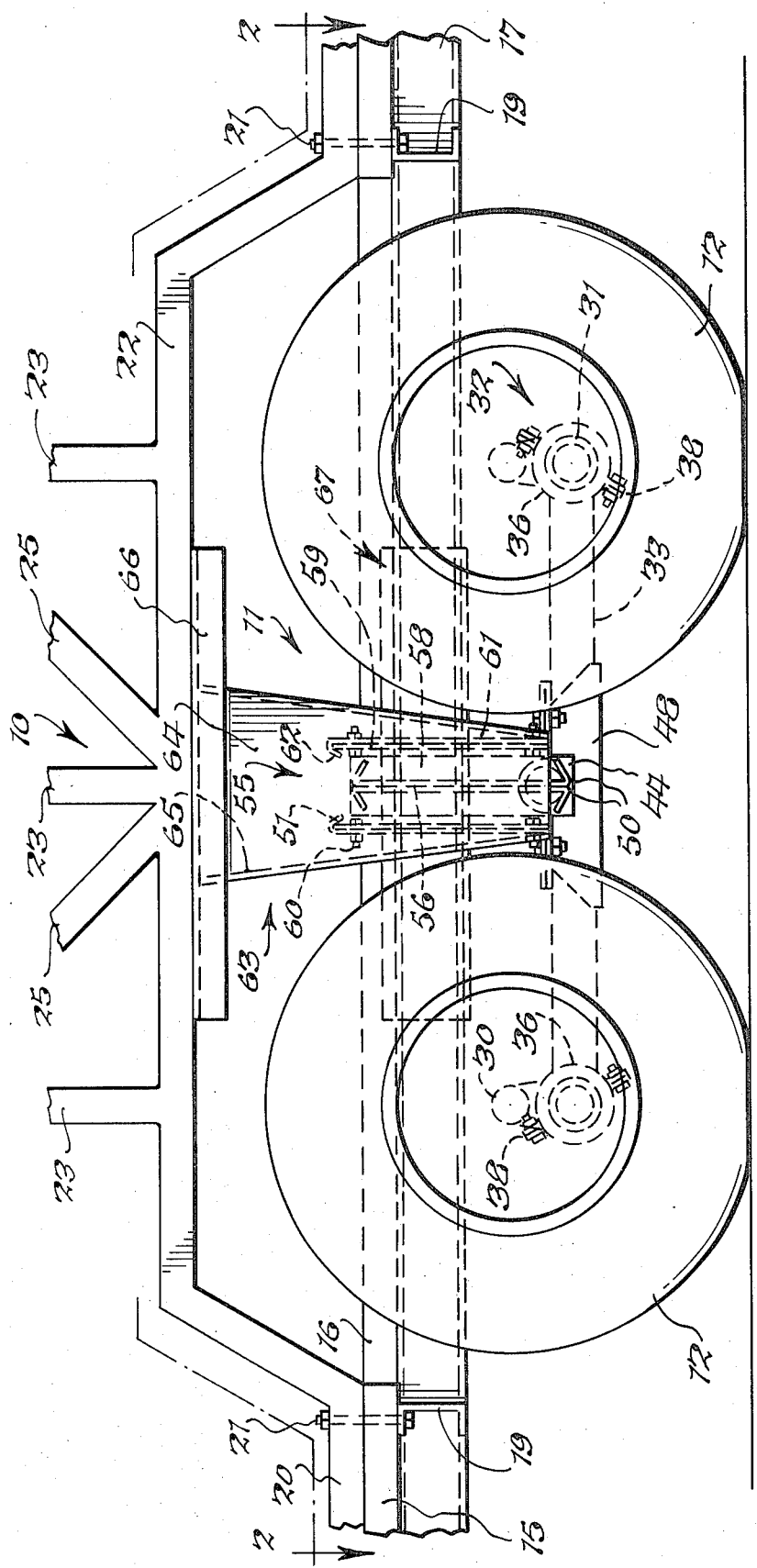
FIG. 1 is a fragmentary side elevation of a trailer frame and spring suspension embodying the present invention.

The vehicle frame 10 is constructed to be light in weight and to permit much lighter parts to be used in each spring suspension 11 supporting each side of the frame 10 on a pair of rubber tired tandem road engaging wheels 12.

To this end the frame includes a generally horizontal bed 15, shown as being a flat wooden panel of plywood or the like. This bed panel forms the floor for the vehicle, shown as being a trailer. This bed panel has rectangular recesses 16 extending inwardly from its opposite longitudinal edges, each of these recesses housing the pair of rubber tired tandem wheels 12 at the corresponding side of the frame.

Figure 2:
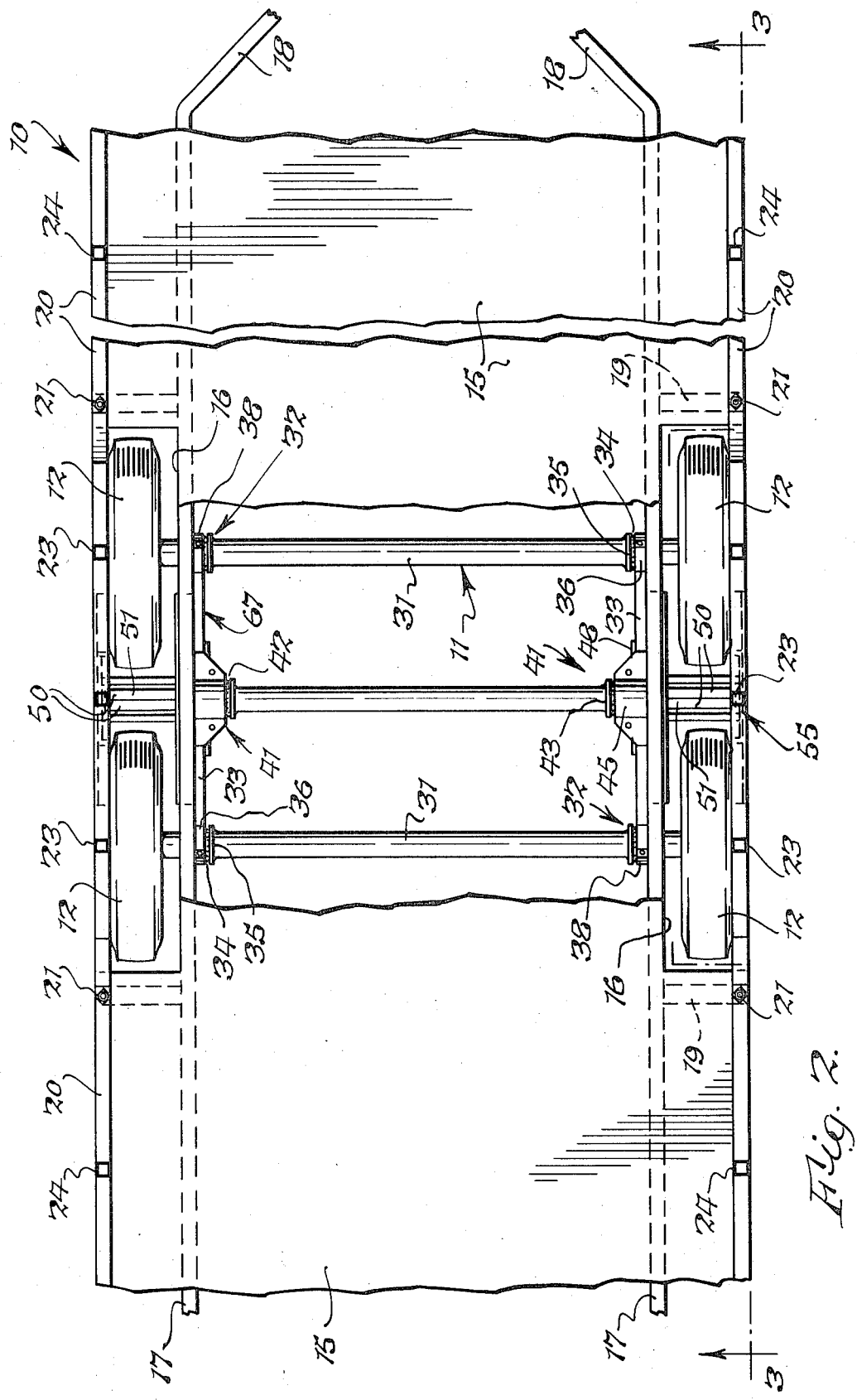
FIG. 2 is a fragmentary horizontal section taken generally on line 2—2, FIG. 1.
Figure 4:
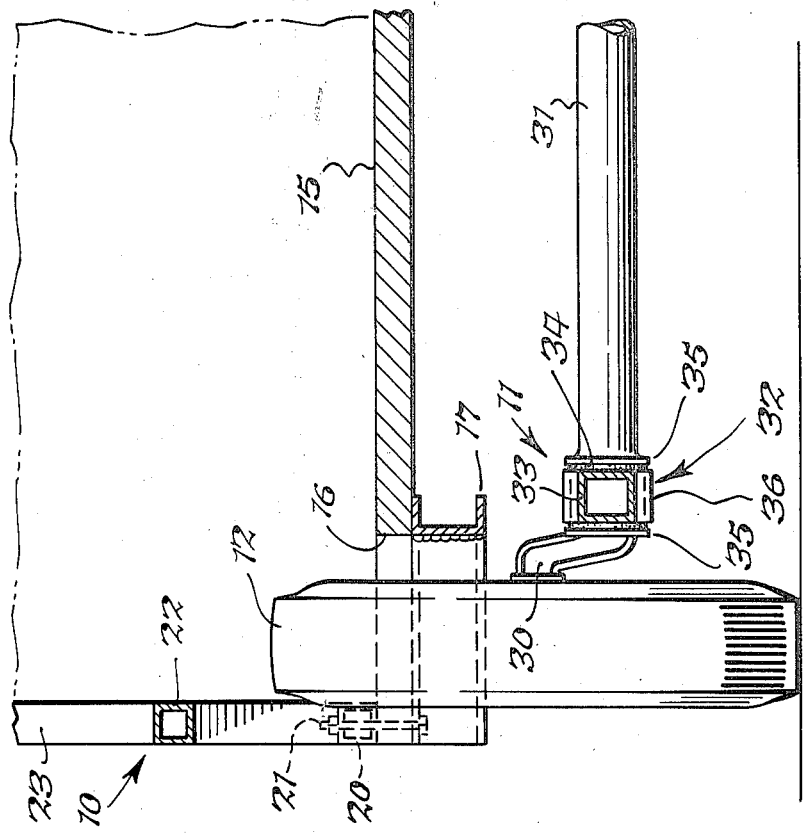

The frame also has a pair of main longitudinal side frame beams 17 under and supporting the bed panel 15, the forward ends 18 of these beams converging toward each other to receive the trailer portion of a hitch (not shown) for attaching the trailer to a hauling vehicle (also not shown). Each main longitudinal side frame beam 17 is arranged along the inner part of a corresponding bed panel recess 16, as best shown in FIGS. 2 and 4. Also four channel beams 19 are welded at their ends to the outer sides of the main longitudinal side frame beams to project horizontally outwardly therefrom along the front and rear edges of each bed panel recess 16. These short channel beams support the bed panel 15 and terminate at the longitudinal side edges thereof.

The frame also includes a bed panel edge bar 20, secured, as by bolts 21, to the bed panel 15 to extend along each of the longitudinal edges thereof. Each of these side panel edge bars 20 is shown as being of rectangular tubular form in cross section and as bolted down on top of the bed panel 15 along its corresponding longitudinal edge.

Each bed panel edge bar 20 arches upwardly, as indicated at 22, to bridge the outer part of the corresponding bed panel recess 16, each bridge portion 22 passing well above the rubber tired wheels 12 to permit ready tire change. Each base of each bridge portion 22 rests on that portion of the bed panel 15 immediately above the outboard end of a short frame channel beam 19 and is connected to the latter by one of the bolts 21 as best shown in FIGS. 1, 2, 3 and 4. The short channel beams 19 therefore provide added support for the bridge portions 22.

The frame 10 also includes a series of vertical spaced metal stud bars 23 secured, as by welding, to the tops of each bridge portion 22 and rising therefrom. The frame 10 additionally includes spaced metal stud bars 24 similarly secured to and rising from those portions of the bed panel edge bars 20 bolted on top of the bed panel 15. The upper ends of all of these vertical metal stud bars 23 and 24 are preferably cross connected by roof members (not shown) and these stud bars and roof members are provided with a skin (also not shown) so that the entire body 10 is in the form of a light, but strong, tube. This strength, particularly of the bridge portions 22, can be increased by providing diagonal metal tubes 25 welded at their bottoms to the center of each bridge portion 22 and at their tops to the adjacent stud bar 23.

THE SPRING SUSPENSION

Each rubber tired wheel 12 is journalled to the upwardly offset end 30 of a full or cross axle 31. Two such full axles are provided, each supported by companion wheels 12 at opposite sides of the vehicle. Each end of these axles 31 is connected by a flexible joint 32 to the end of a walking beam 33. Each flexible joint 32 is preferably in the form of a rubber bushed bearing and for this purpose a rubber bushing 34 is interposed between a pair of annular radially protruding flanges 35 formed at the end of each axle 31. Each rubber bushing 35 is compressed between a half bearing housing 36 formed at each end of each walking beam 33 and a companion half bearing housing 38, these half bearing housings being drawn together by bolts, as shown.

Figure 3:
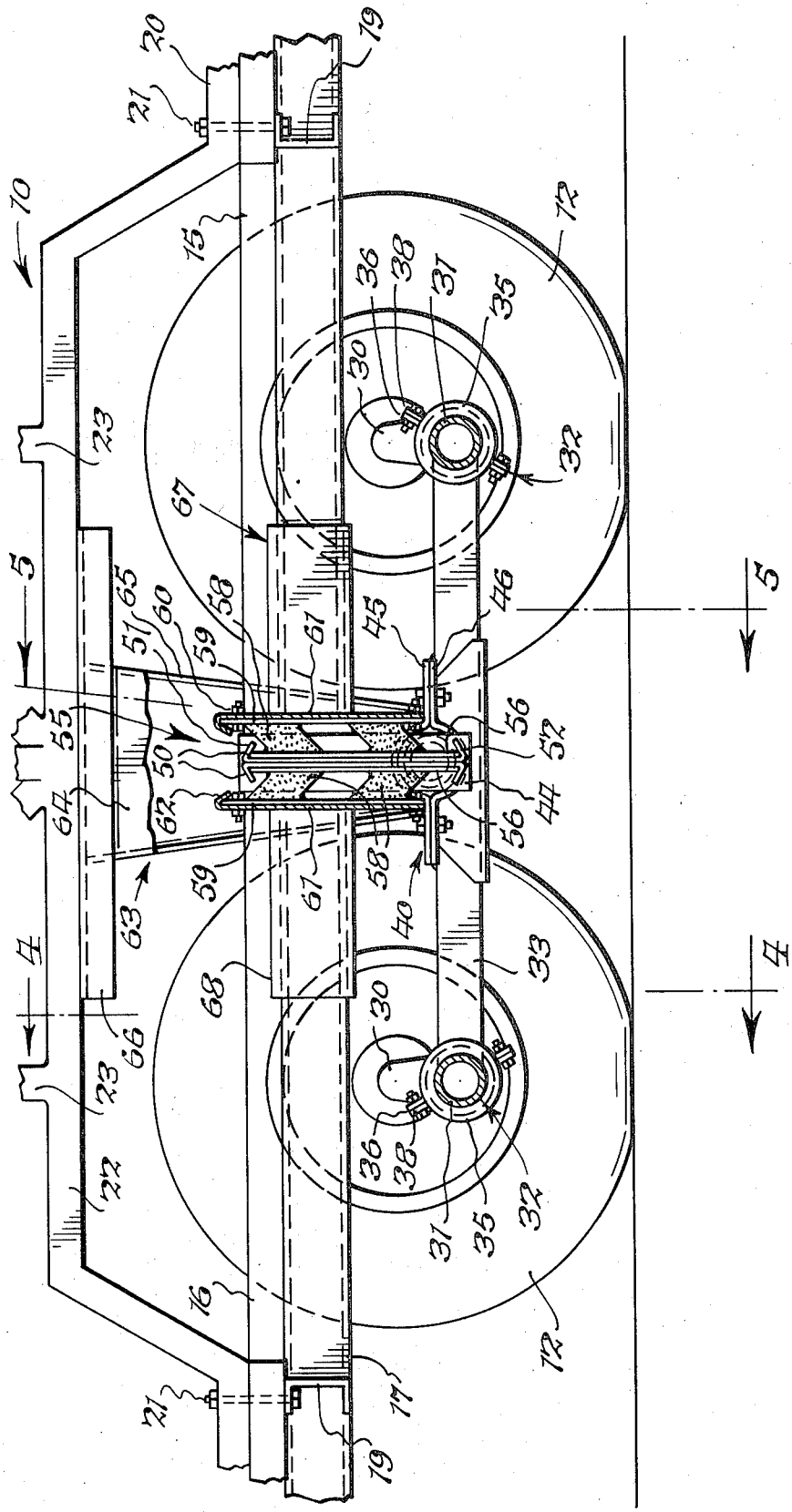
FIG. 3 is a fragmentary vertical section taken generally on line 3—3, FIG. 2.
Figure 5:
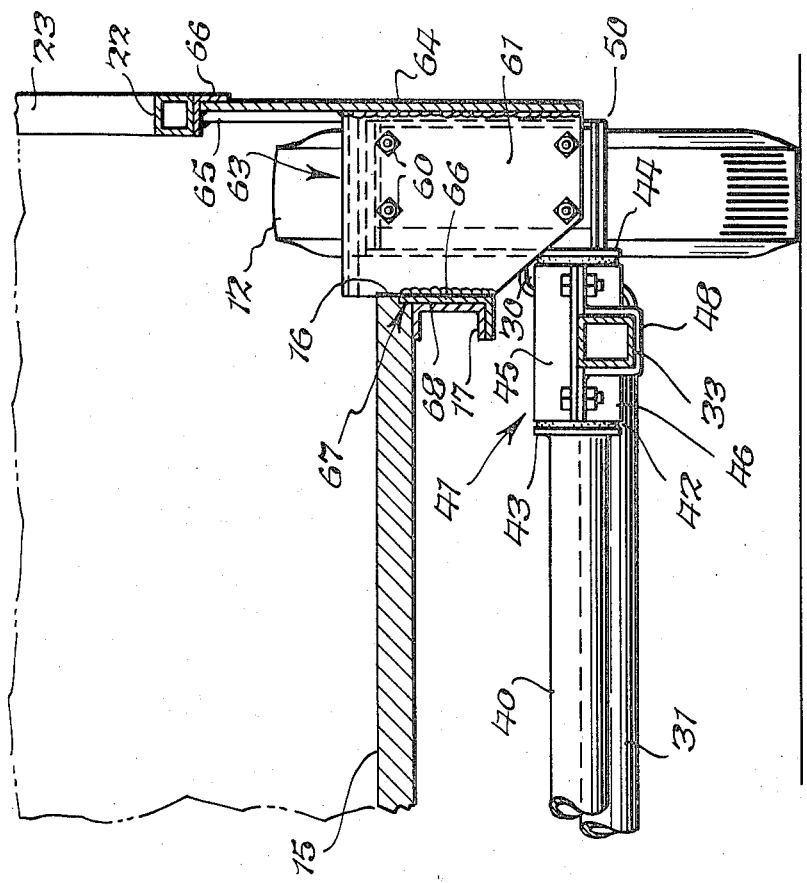
FIGS. 4 and 5 are fragmentary vertical sections taken generally on the correspondingly numbered lines, FIG. 3.

Each walking beam 33 is preferably of rectangular tubular form in cross section and at its center is recessed to pass the corresponding end of a cross shaft or tubular rod 40 to which it is journalled by means of a rubber bushed bearing 41. Each of these rubber bushed bearings 41 comprises a rubber bushing 42 interposed between a radially projecting annular flange 43 provided near each end of the cross shaft 40 and a thick gage rectangular plate 44 welded to and rising from the annular end edge of the tubular cross shaft 40. The upper part of each rubber bushing 42 is embraced by an upper half bearing housing 45, while the lower part of each rubber bushing 42 is embraced by a lower half bearing housing 46. Each pair of these half bearing housings 45, 46 is drawn into compressive relation to their rubber bushing 42 by bolts, as shown. Each lower half bearing housing 46 is also welded to an upwardly opening channel 48 which cradles and is welded to the center of the companion tubular walking beam 33 as best shown in FIGS. 2, 3 and 5.

Two pairs of vertical plates 50 are arranged back-to-back and to extend transversely of the line of vehicle travel. Each pair of these plates have their inner edges welded to the center of a corresponding one of the rectangular upright transverse plates 44 to extend outwardly therefrom between the corresponding pair of tandem rubber tired wheels 12. Each of these plates 50 also has reversely formed flanges 51, 52 along their upper and lower horizontal edges, these flanges converging toward each other and toward the center of the corresponding rubber tired wheel 12.

The resilient resistance in the spring suspension is substantially entirely provided by two pairs of rectilinear movement shear rubber springs 55 at each side of the vehicle, each of these springs comprising an inner rectangular metal plate 56, a pair of rectilinear movement flexible shear rubber bodies 58 vulcanized to one face thereof, and a second rectangular metal plate 59 vulcanized to the opposite sides of the pair of shear rubber bodies dies 58. The rubber bodies 58 are of rectangular cross section parallel with the plates 56, 59 and, when unstressed, of parallelogram cross section lengthwise of the line of vehicle travel as shown in FIG. 3.

The inner plate 56 of each rectilinear movement shear rubber spring 55 is slidingly fitted against the corresponding metal plate 50 between the converging pairs of flanges 51 thereof. This sliding is from the outer edge side of each plate 50 toward the center of the vehicle, with the upper and lower edges of the plate 56 traveling along the ways provided by the converging flanges 51. These flanges constitute the sole means of securement of each rubber spring plate 56 to the companion plate 50, no bolts, weldments or other fastenings being required.

The outer plate 59 of each rectilinear movement shear rubber spring 55 is secured by four corner bolts 60 to a metal plate 61. Each of these metal plates 61 additionally has a reversely formed or C-shaped flange 62 which fits over the top edge of its shear rubber spring plate 59.

At each side of the vehicle, a first frame bracket 63 depends from the bridge portion 22 of the corresponding bed panel edge bar 20. This first frame bracket 63 includes a vertical metal plate 64 fitting against and welded to the outer vertical edges of the corresponding pair of metal plates 61. The fore-and-aft vertical edges of each plate 64 are also preferably reinforced by flanges 65. The upper edge of each plate 64 is welded inside an angle bar 66 which is in turn welded to the bottom of the bridge portion 22 of the corresponding bed panel edge bar 20.

At each side of the vehicle a second frame bracket 67 depends from the corresponding main longitudinal side frame beam 17. This second frame bracket 67 includes an L-shaped metal plate 68, the vertical part of which is fitted against and welded to the inner edges of the corresponding pair of metal plates 61. The horizontal part of each L-shaped metal plate 68 fits under the corresponding main longitudinal side frame beam 17, the metal plate extending lengthwise of and being welded to this main longitudinal side frame beam as best shown in FIG. 3.

OPERATION

In the operation of the suspension, the upward movement of one end of, say, the front tandem axle 31, through the corresponding rubber bushed bearing 32, effects upward movement of the front end of the corresponding walking beam 33.

This upward movement of the forward end of this walking beam 33 raises its half bearing housings or rock sleeve 45, 46 (FIGS. 2 and 5) at the center of the walking beam 33 and which is journalled through the rubber bushing 42 on the corresponding end of the tubular cross shaft 40. This rubber bushing 42 is of sufficient radial thickness to permit the required rocking of the walking beam 33 and provides a frictionless bearing which is free from lubrication requirements.

The upward movement of one end of the tubular cross shaft or rod 40 raises the corresponding vertical cross plate 44 welded to the annular end thereof and also the flanged back-to-back plates 50 edge welded, along their inner vertical edges, to the outer face of this cross plate 44. Through the converging flanges 51 of these back-to-back plates 50 this raises the rectangular plates 56 of the corresponding pair of rectilinear movement shear rubber springs 55 thereby to distort upwardly the opposing sides of the rubber bodies 58 of this pair of springs. Accordingly this force is transmitted through the outer rectangular metal plates 59 of these rubber springs and bolts 60 to the pair of metal plates 61. These plates 61 transmit this force to the first frame bracket 63, these plates 61 being welded at their outer vertical edges to the inner face of the vertical plate 64 of this first frame bracket. This first frame bracket 63 transmits this force to the bridge portion 22 of the corresponding bed panel edge bar 20 and thence to the bed panel 15 of the frame 10.

Also these plates 61 transmit this force to the second frame bracket 67, these plates 61 being welded at their inner vertical edges to the outer vertical face of the L-shaped metal plate 68. This L-shaped metal plate 68 is welded to, and hence transmits this force, to the corresponding main longitudinal side frame beam 17.

By so providing the bed panel 15 with the edge bars 20, and their bridging portions 22 (these bars being further strengthened by the posts 23, 24 and the top beams and skin which are not shown) and by having the first frame brackets 63 supporting these edge bed panel bars 20, 21, and by having the second frame brackets 67 supporting the main longitudinal side frame beams 18, these frame brackets can be made very light in weight. Also the very simple back-to-back plates 50 edge welded via the rectangular plates 44 to the ends of the rock shaft 40 provide a very simple and low cost manner of connecting the walking beams 33 to the rubber springs 55. Also a stronger body or frame 10 can be provided, even though made of lighter frame components. At the same time the advantages of a friction and service free suspension in which relative movement of metal parts is transmitted through rubber bodies are retained. The rectilinear movement shear rubber bodies providing the resilient resistance to vertical frame movement are also widely spaced to provide wide effective spring centers and greatly increased side-sway stability.

By "rubber" as used in the accompanying claims is meant natural synthetic rubber or mixtures thereof.

I claim:

1. A tandem wheel vehicle spring suspension adapted to be interposed between the frame of a vehicle and a pair of tandem rubber tired wheels at each side of the vehicle, each pair of said rubber tired wheels on each side of the vehicle being journalled to the opposite ends of a generally horizontal walking beam extending lengthwise of the line of vehicle travel; wherein the improvement comprises said frame including a generally horizontal rigid bed panel having recesses extending inwardly from its opposite longitudinal edges and each housing one pair of said tandem wheels, and the frame also having generally horizontal main longitudinal side frame beams supporting said bed panel and arranged along the inner parts of said recesses, a bed panel edge bar secured to said bed panel to extend along each of said opposite longitudinal edges thereof and each having a portion bridging the outer part of the corresponding recess, a first frame bracket secured to a central portion of each of said bridging portions, a second frame bracket fixed to each main longitudinal side frame beam centrally of the corresponding recess, and rectilinear movement shear rubber spring means supporting each pair of said first and second frame brackets on the corresponding walking beam near the center thereof.

2. A tandem wheel vehicle spring suspension as set forth in claim 1 additionally including vertical stud bars rising from each of said bed panel edge bars to support side walls for said frame and to reinforce said bed panel edge bars.

3. A tandem wheel vehicle spring suspension as set forth in claim 2 wherein at least one of said stud bars is secured to and rises from a central part of each of said bridging portions to reinforce the central portions of said bridging portions so carried by said first frame brackets.

4. A tandem wheel vehicle spring suspension as set forth in claim 1 wherein each said first bracket comprises an upright plate fixed to and projecting downwardly from its bridging portion generally parallel to the line of vehicle travel, each said second bracket comprises an upright plate fixed to and projecting downwardly from its main longitudinal side frame beam generally parallel and adjacent the corresponding first frame bracket, and said spring means at each side of the vehicle comprises a pair of spaced upright plates interposed between and secured at their edges to said first and second bracket plates, and a pair of rectilinear movement shear rubber bodies operatively interposed between each of said pair of spaced upright plates and the corresponding walking beam.

5. A tandem wheel vehicle spring suspension as set forth in claim 1 wherein said spring means includes a generally horizontal cross shaft extending transversely of the line of vehicle travel with its opposite ends arranged adjacent the central portions of said walking beams, a flexible joint mounting said central portion of each of said walking beams on the corresponding end of said cross shaft, an upright metal member fixed to each end of said cross shaft, at least one upright metal plate secured at its inner vertical edge to the outer face of each said upright metal member and extending outwardly therefrom between the corresponding pair of tandem wheels transversely of the line of vehicle travel, and a pair of rectilinear movement shear rubber springs fixed to opposite sides of each said upright plate and operatively connected to both the corresponding first and second frame brackets.

6. A tandem wheel vehicle spring suspension as set forth in claim 1 wherein said spring means includes a generally horizontal cross shaft extending transversely of the line of vehicle travel with its opposite ends arranged adjacent the central portions of said walking beams, a flexible joint mounting said central portion of each of said walking beams on the corresponding end of said cross shaft, an upright metal member fixed to each end of said cross shaft, a pair of back-to-back plates welded along their inner vertical edges to each upright metal member and extending outwardly therefrom between the corresponding pair of tandem wheels transversely of the line of vehicle travel, each of said plates having upper and lower edge flanges converging toward the corresponding wheel, a pair of rectilinear movement shear rubber springs at each side of the vehicle, each comprising spaced inner and outer metal plates and a flexible rubber body vulcanized to the opposing faces thereof, the inner plate of each of said rectilinear movement shear rubber springs being slidingly fitted against the exposed face of a corresponding one of said back-to-back plates between the upper and lower flanges thereof, and means connecting the outer plate of each of said rectilinear movement shear rubber springs to both of the corresponding first and second frame brackets.

7. A tandem wheel vehicle spring suspension as set forth in claim 6 wherein said last means comprises metal plates arranged between and welded at their vertical edges to the corresponding first and second frame brackets and extending transversely of the line of vehicle travel with their inner faces engaging and fastened to the outer faces of the outer plates of the corresponding rectilinear movement shear rubber springs.

8. A tandem wheel vehicle spring suspension as set forth in claim 7 wherein said first and second frame brackets comprise vertical metal plates arranged in planes lengthwise of the line of vehicle travel and welded at their upper edges, respectively, to the corresponding bridge portions and main longitudinal side frame beams.

9. A tandem wheel vehicle spring suspension as set forth in claim 1 additionally including four short horizontal beams end welded to said main longitudinal side frame beams to project outwardly therefrom along the front and rear edges of said recesses under said bed panel edge bars to support the latter at the bases of the bridging portions thereof.

* * * * *